United States Patent
Park et al.

(10) Patent No.: US 12,005,527 B2
(45) Date of Patent: Jun. 11, 2024

(54) SYSTEM FOR ASSEMBLING VEHICLE BODY COMPONENTS

(71) Applicants: HYUNDAI MOTOR COMPANY, Seoul (KR); KIA CORPORATION, Seoul (KR)

(72) Inventors: YoungHyun Park, Ulsan (KR); Jaesoon Park, Ulsan (KR); Kapmoon Park, Ulsan (KR); Jeong Hwan Ha, Gyeongju-si (KR); Hyunsam Jo, Ulsan (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 417 days.

(21) Appl. No.: 17/540,633

(22) Filed: Dec. 2, 2021

(65) Prior Publication Data

US 2023/0008956 A1    Jan. 12, 2023

(30) Foreign Application Priority Data

Jul. 9, 2021    (KR) .................. 10-2021-0090317

(51) Int. Cl.
  *B23K 37/04*    (2006.01)
  *B62D 65/02*    (2006.01)
  *B23K 101/00*   (2006.01)

(52) U.S. Cl.
  CPC ........ *B23K 37/0443* (2013.01); *B62D 65/026* (2013.01); *B23K 2101/006* (2018.08)

(58) Field of Classification Search
  CPC .......... B23K 37/0443; B23K 2101/006; B23K 37/00–047; B23K 37/0435;
  (Continued)

(56) References Cited

U.S. PATENT DOCUMENTS 4,863,092 A * 9/1989 Nguyen ................. B23K 3/087
                                            29/430
5,427,300 A * 6/1995 Quagline ............... B62D 65/02
                                            228/49.1

(Continued)

FOREIGN PATENT DOCUMENTS

CN    104289849 A * 1/2015 ......... B23K 37/0443
CN    105171287 A * 12/2015 ............ B23K 37/00
(Continued)

*Primary Examiner* — Kiley S Stoner
(74) *Attorney, Agent, or Firm* — MCDONNELL BOEHNEN HULBERT & BERGHOFF LLP

(57) ABSTRACT

A system for assembling vehicle body components includes an index table rotatably installed on a mounting frame, assembly units disposed on an upper surface of the index table in four directions by rotary plates, and each including a replacement jig and a fixing jig, the replacement jig and the fixing jig being configured to allow the first and second components to be loaded thereon, and the assembly units being configured to be rotated by a predetermined angle by the index table so that the first and second components are joined together by welding while passing through a plurality of assembly sections, a replacement jig palette positioned in a first assembly section, a component palette positioned in a second assembly section, a plurality of clamping units positioned in a third assembly section, and welders positioned in the third assembly section and the fourth assembly section.

16 Claims, 11 Drawing Sheets

(58) Field of Classification Search
CPC .............. B23K 37/0294; B62D 65/026; B62D 65/022; B62D 65/18; B23P 21/006; B23P 2700/50; B23P 19/007; B60Y 2410/124
USPC .... 228/212–213, 44.3, 47.1, 49.1–49.2, 49.4
See application file for complete search history.

(56) References Cited

U.S. PATENT DOCUMENTS

| | | | | |
|---|---|---|---|---|
| 2016/0152448 | A1* | 6/2016 | Kreischer | B25H 1/0007 294/81.2 |
| 2017/0028495 | A1* | 2/2017 | Jin | B23K 37/0443 |
| 2018/0111214 | A1* | 4/2018 | Garcia | B62D 65/022 |

FOREIGN PATENT DOCUMENTS

| | | | | | |
|---|---|---|---|---|---|
| CN | 105618894 | A | * | 6/2016 | ......... B23K 37/0229 |
| CN | 106078058 | A | * | 11/2016 | |
| CN | 106216919 | A | * | 12/2016 | ......... B23K 37/0443 |
| CN | 106891124 | A | * | 6/2017 | ......... B23K 37/0443 |
| CN | 107931937 | A | * | 4/2018 | ......... B23K 37/0443 |
| CN | 108436449 | A | * | 8/2018 | ............ B23P 21/006 |
| CN | 108788718 | A | * | 11/2018 | |
| CN | 109093390 | A | * | 12/2018 | ............ B23P 19/001 |
| CN | 109530997 | A | * | 3/2019 | ............ B23K 37/00 |
| CN | 110153697 | A | * | 8/2019 | |
| CN | 110421303 | A | * | 11/2019 | |
| CN | 111203665 | A | * | 5/2020 | |
| CN | 111203666 | A | * | 5/2020 | |
| CN | 111250883 | A | * | 6/2020 | |
| CN | 110773982 | B | * | 5/2021 | ............ B23P 19/001 |
| CN | 112318028 | A | * | 5/2021 | |
| CN | 113172368 | A | * | 7/2021 | |
| CN | 113245736 | A | * | 8/2021 | ............ B23K 31/02 |
| CN | 113427260 | A | * | 9/2021 | |
| CN | 113492275 | A | * | 10/2021 | |
| CN | 113664418 | A | * | 11/2021 | |
| CN | 113714596 | A | * | 11/2021 | |
| CN | 114682954 | A | * | 7/2022 | |
| CN | 114770002 | A | * | 7/2022 | |
| DE | 20211755 | U1 | * | 1/2004 | ........... B23K 37/047 |
| DE | 102006020924 | A1 | * | 11/2007 | ........... B23K 37/047 |
| DE | 102018009051 | A1 | | 5/2020 | |
| KR | 100759859 | B1 | * | 9/2007 | |
| WO | WO-2008080811 | A2 | * | 7/2008 | ........... B23K 37/047 |

* cited by examiner

SYSTEM FOR ASSEMBLING VEHICLE BODY COMPONENTS

CROSS REFERENCE TO RELATED APPLICATIONS

This application claims priority to and the benefit of Korean Patent Application No. 10-2021-0090317 filed in the Korean Intellectual Property Office on Jul. 9, 2021, the entire contents of which are incorporated herein by reference.

BACKGROUND

(a) Field

The present disclosure relates to a system for assembling vehicle body components, and more particularly, to a system for assembling vehicle body components, which is capable of handling various types of vehicles.

(b) Description of the Related Art

In general, a front floor of a vehicle body is a structure positioned at a front end of an occupant compartment.

The front floor is positioned at a boundary between the occupant compartment and an engine room and covers front and lower sides of a driver seat and a passenger seat.

The front floor mainly includes apron member assemblies and a dash panel.

The apron member assemblies are disposed at two opposite sides in a vehicle width direction, and the dash panel is seated on an upper portion of the apron member assembly.

Further, the apron member assembly and the dash panel are joined by many carriages and robots through a plurality of processes.

Different front floors are provided depending on types of vehicles. Therefore, in the related art, different carriages for moving and assembling the apron member assemblies and the dash panels are required for respective types of vehicles.

As a result, a system for assembling vehicle body components in the related art requires a large factory site and consistently incurs facility investment costs.

Meanwhile, personnel expenses essentially increase as the number of overseas factories increases.

There is a need for research and development on a system capable of cooperating with persons and robots to meet the requirement of the overseas factories.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a system for assembling vehicle body components, which is capable of handling various types of vehicles and reducing initial investment costs.

The present disclosure has also been made in an effort to provide a system for assembling vehicle body components, in which the types of vehicles may be changed even manually, thereby simplifying a facility and reducing a facility weight and manufacturing costs.

An exemplary embodiment of the present disclosure provides a system for assembling vehicle body components, which assembles first and second components to be applied to a vehicle, the system including an index table rotatably installed on a mounting frame, assembly units disposed on an upper surface of the index table in four directions by means of rotary plates and each including a replacement jig configured to be attachable or detachable depending on the types of vehicles, and a fixing jig fixed and spaced apart from the replacement jig, the replacement jig and the fixing jig being configured to allow the first and second components to be loaded thereon, and the assembly units being configured to be rotated by a predetermined angle by the index table so that the first and second components are joined together by welding while passing through a plurality of assembly sections, a replacement jig palette positioned in a first assembly section and configured to store the plurality of replacement jigs for the respective types of vehicles, a component palette positioned in a second assembly section and configured to store the plurality of first components and the plurality of second components, a plurality of clamping units positioned in a third assembly section, provided depending on the types of vehicles, and configured to clamp the first and second components seated on the replacement jig and the fixing jig, and welders positioned in the third assembly section and the fourth assembly section and configured to weld the first and second components.

In addition, the rotation of the rotary plate of the assembly unit may be supported by a plurality of support rollers provided on an upper portion of the mounting frame and disposed around the rotary plate.

In addition, each assembly unit may include, fixing plates disposed on an upper surface of the rotary plate at predetermined intervals, the pair of replacement jigs provided on an upper surface of the fixing plate, disposed outside of a center of the index table, symmetrically configured at two opposite sides facing each other, and configured to be replaced depending on the types of vehicles; and the pair of fixing jigs provided on the fixing plate, disposed inside of the center of the index table, symmetrically configured at two opposite sides facing each other, and having positions that are changed by an adjustment device in a direction in which the pair of fixing jigs moves toward or away from each other.

In addition, each replacement jig may include an air chuck fixed to the fixing plate, and a replacement jig module detachably mounted by means of the air chuck and comprising a plurality of first tooling pins having positions set for the respective types of vehicles so as to be fitted into corresponding tooling holes of the first and second components.

In addition, each fixing jig may include a fixing table fixed to the fixing plate, a fixing jig module provided on the fixing table, mounted to be slidable by a first drive unit, and having a second tooling pin fitted into a corresponding tooling hole of the first component, and the adjustment device provided on the fixing table, disposed at one side adjacent to the fixing jig module, and having a plurality of stoppers protruding toward the fixing jig module to change a position of the second tooling pin depending on the types of vehicles.

In addition, each fixing jig module may include a movable plate provided on the fixing table and mounted to be slidable along a rail, a second tooling pin may be mounted on the movable plate by means of a connection block, the first drive unit may be connected to the connection block, and a contact block, which comes into contact with the stopper, may be mounted at one side of the movable plate opposite to the first drive unit and configured to come into contact with the stopper by means of the contact block.

In addition, each adjustment device may include a stopper mounting plate mounted to be slidable along the fixing jig module and configured to allow the stoppers to be mounted thereon, a wire connected to and penetrating the stopper mounting plate, a handle part connected to one end of the wire and disposed at a tip of the wire, and a balance part disposed at the other end of the wire and configured to provide a restoring force to the wire.

In addition, each handle part may include a sub-table fixed to the fixing plate, a restriction bracket installed on the sub-table and having a plurality of restriction grooves for setting positions of the stoppers that come into contact with the fixing jig module for the respective types of vehicles, and a rod connected to one end of the wire, fitted into the restriction bracket, and configured to allow a restriction pin mounted on an outer surface thereof to be fitted into the restriction groove depending on the types of vehicles.

In addition, each balance part may include a restoring spring configured to provide a restoring force to the wire.

In addition, each assembly unit may further include a pressing unit disposed at one side adjacent to the replacement jig and configured to press and fix the first component seated on the replacement jig in a vertical direction.

In addition, each pressing unit may include a link arm having a roller mounted at one side tip thereof and configured to be in slipping contact with the first component, a second drive unit hingedly connected to the other side tip of the link arm, mounted on the fixing plate, and configured to push the other side tip of the link arm upward, and a link bracket hingedly connected to one lower side of the link arm, hingedly connected to one side of the second drive unit, and configured to support an operation of the link arm.

In addition, each clamping unit may be mounted at a tip of a robot arm and configured to clamp the first and second components in a state in which the clamping unit is connected to a docking unit disposed between the pair of fixing jigs.

In addition, each docking unit may include a docking table disposed between the pair of fixing jigs and fixed to the fixing plate, docking plates disposed at two opposite sides of an upper surface of the docking table, docking pins positioned in and penetrating the docking plates, and configured to be raised or lowered by a third drive unit to dispose the clamping unit at an exact position when the clamping unit is seated on the docking plates, and a plurality of rotary clampers provided on the docking table, mounted at one side adjacent to the docking plate, and configured to fix the clamping unit by being rotated by a fourth drive unit when the clamping unit is seated on the docking plates.

In addition, each clamping unit may include a body seated on the docking table, a connection plate disposed on a lower surface of the body, configured to correspond to the docking plate, and connected to the docking plate, a docking hole disposed on the connection plate and configured to allow the docking pin to be inserted thereinto, a plurality of clamping arms symmetrically disposed at two opposite sides of the body facing each other and configured to clamp the first and second components by a fifth drive unit when the first and second components are seated on the replacement jig and the fixing jig, third tooling pins disposed at two opposite ends of a lower surface of the body and inserted into corresponding tooling holes of the first component, and fourth tooling pins disposed at lateral sides of a central portion of the body and inserted into corresponding tooling holes of the second component.

In addition, the welders may include a first welder positioned in the third assembly section and configured to weld the first and second components using a robot.

In addition, the welders may include a second welder positions in the fourth assembly section and configured to weld the first and second components using a robot.

The system for assembling vehicle body components according to the embodiment of the present disclosure may handle various types of vehicles, thereby reducing initial investment costs.

Further, according to the system for assembling vehicle body components according to the embodiment of the present disclosure, the types of vehicles may be changed even manually, thereby simplifying the facility and reducing the facility weight and manufacturing costs.

Since the rotatable index table is applied to the system for assembling vehicle body components according to the embodiment of the present disclosure, the space efficiency may be improved.

Other effects, which may be obtained or expected by the embodiments of the present disclosure, will be directly or implicitly disclosed in the detailed description on the embodiments of the present disclosure. That is, various effects expected according to the embodiments of the present disclosure will be disclosed in the detailed description to be described below.

DETAILED DESCRIPTION

Figure 1:
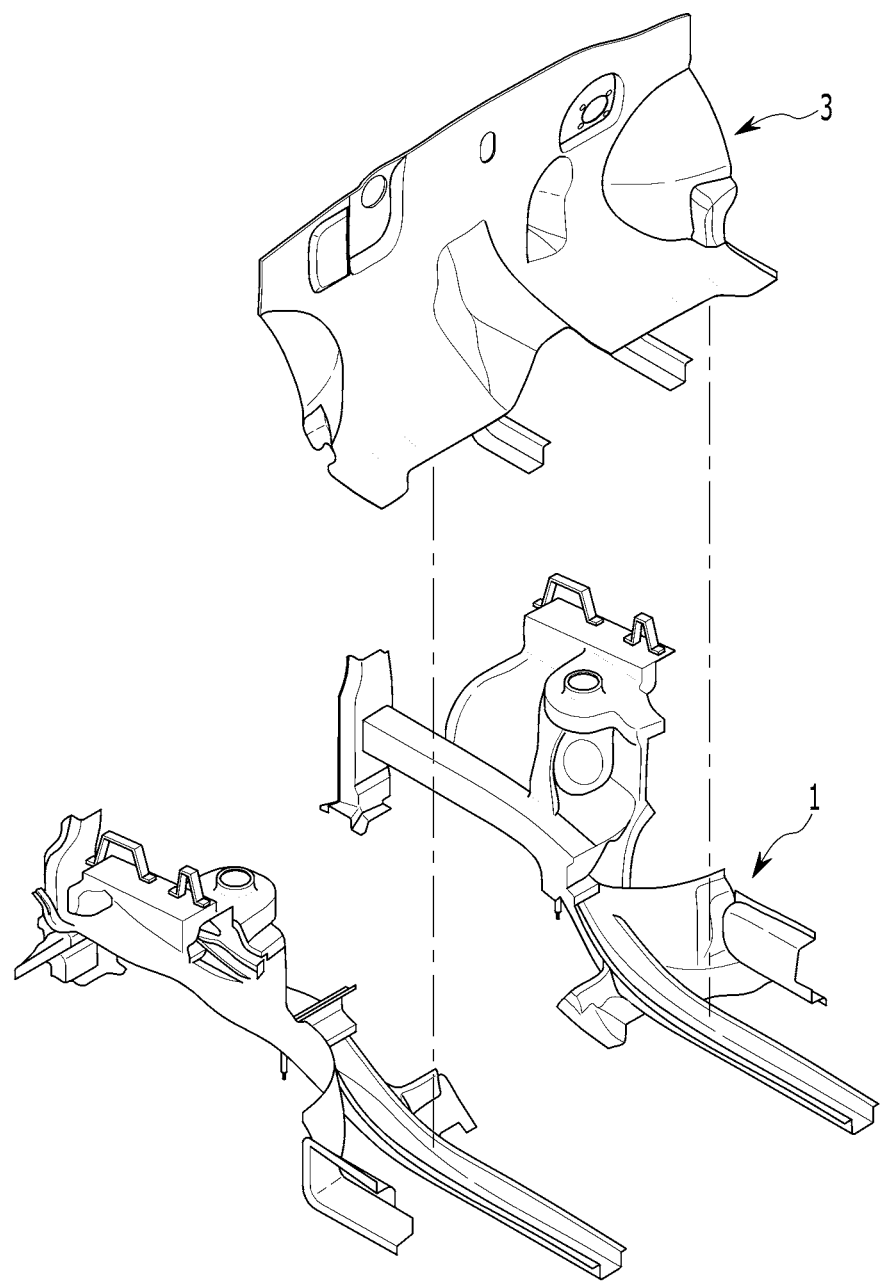
FIG. 1 is a view illustrating vehicle body components assembled by a system for assembling vehicle body components according to the embodiment of the present disclosure.

Hereinafter, embodiments of the present disclosure will be described in detail with reference to the accompanying drawings so that those with ordinary skill in the art to which the present disclosure pertains may easily carry out the embodiments. However, the present disclosure may be implemented in various different ways and is not limited to the embodiments described herein.

A part irrelevant to the description will be omitted to clearly describe the present disclosure, and the same or similar constituent elements will be designated by the same reference numerals throughout the specification.

In the following description, names of constituent elements are classified as a first . . . , a second . . . , and the like so as to discriminate the constituent elements having the same name, and the names are not essentially limited to the order in the description below.

Figure 2:
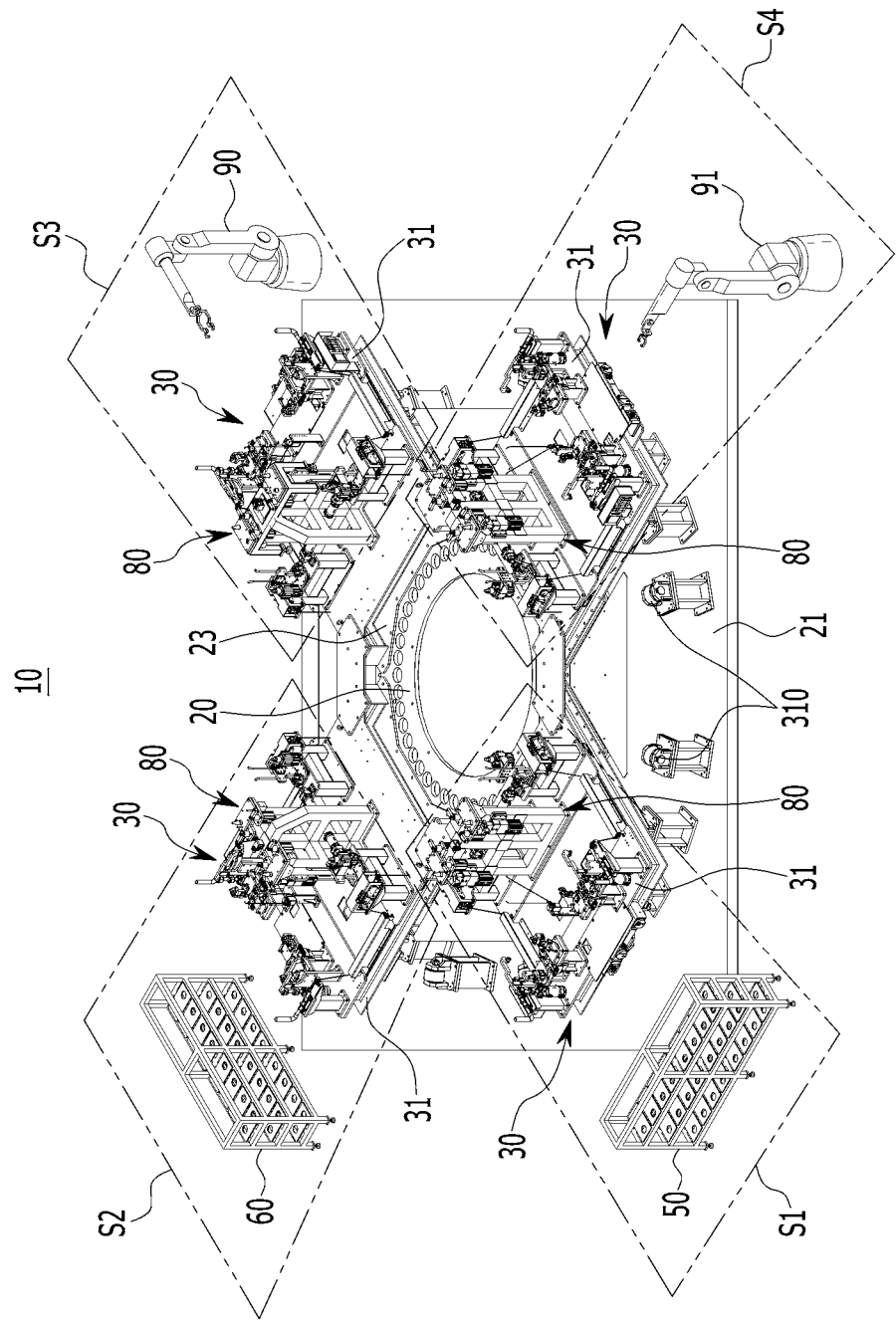
FIG. 2 is an overall configuration view illustrating the system for assembling vehicle body components according to the embodiment of the present disclosure.

FIG. 1 is a view illustrating vehicle body components assembled by a system for assembling vehicle body components according to the embodiment of the present disclosure, and FIG. 2 is an overall configuration view of the system for assembling vehicle body components according to the embodiment of the present disclosure.

Referring to FIGS. 1 and 2, a system 10 for assembling vehicle body components according to an embodiment of the present disclosure is applied to assemble a first component 1 and a second component 3 which are to be applied to a vehicle.

Examples of the first component 1 may include front apron members provided at a front side of a vehicle and respectively disposed at two opposite sides in a vehicle width direction. Examples of the second component 3 may include a dash panel seated on an upper portion of the front apron member.

The system 10 for assembling vehicle body components according to the embodiment of the present disclosure may be applied not only to assemble the front apron member and the dash panel, but also to assemble other components applied to the vehicle body.

In addition, the shape of the front apron member and the shape of the dash panel vary depending on the types of vehicles. The system 10 for assembling vehicle body components according to the embodiment of the present disclosure may handle various types of vehicles.

To this end, referring to FIG. 2, the system 10 for assembling vehicle body components according to the embodiment of the present disclosure includes an index table 20, assembly units 30, a replacement jig palette 50, a component palette 60, clamping units 70, and welders 90 and 91.

The system 10 for assembling vehicle body components has the four identical assembly units 30 disposed in four directions on an upper surface of the index table 20.

The first component 1 and the second component 3 are assembled and joined together by welding while sequentially passing through first to fourth assembly sections S1, S2, S3, and S4 by a rotation of the index table 20. In this case, the index table 20 is rotatably installed on a mounting frame 21. The index table 20 has a ring shape and operates like a worm gear. In addition, the index table 20 may rotate at a preset angle using a servo motor. A rotary plate 23 is seated on the upper surface of the index table 20.

The assembly units 30 are disposed in the four directions on an upper surface of the rotary plate 23.

The first to fourth assembly sections S1, S2, S3, and S4 are defined outside the center of the index table 20. The first to fourth assembly sections S1, S2, S3, and S4 are spaced apart from one another at 90° based on the center of the index table 20.

In the system 10 for assembling vehicle body components, the process of assembling the first component 1 and the second component 3 is started from the first assembly section S1 and completed in the fourth assembly section S4 via the second assembly section S2 and the third assembly section S3 by the rotation of the index table 20.

The positions of the first to fourth assembly sections S1, S2, S3, and S4 are not necessarily fixed, but may be changed by a design change, as necessary.

Meanwhile, the replacement jig palette 50 corresponds to the first assembly section S1. The replacement jig palette 50 stores a plurality of replacement jigs 33 (see FIG. 4) for the respective types of vehicles. The replacement jigs 33 stored in the replacement jig palette 50 may be supplied manually by a user or automatically by a robot.

Further, the component palette 60 corresponds to the second assembly section S2. The component palette 60 stores the plurality of first components 1 and the plurality of second components 3 for the respective types of vehicles.

The first and second components 1 and 3 stored in the component palette 60 may be supplied manually by the user or automatically by the robot.

Figure 3:
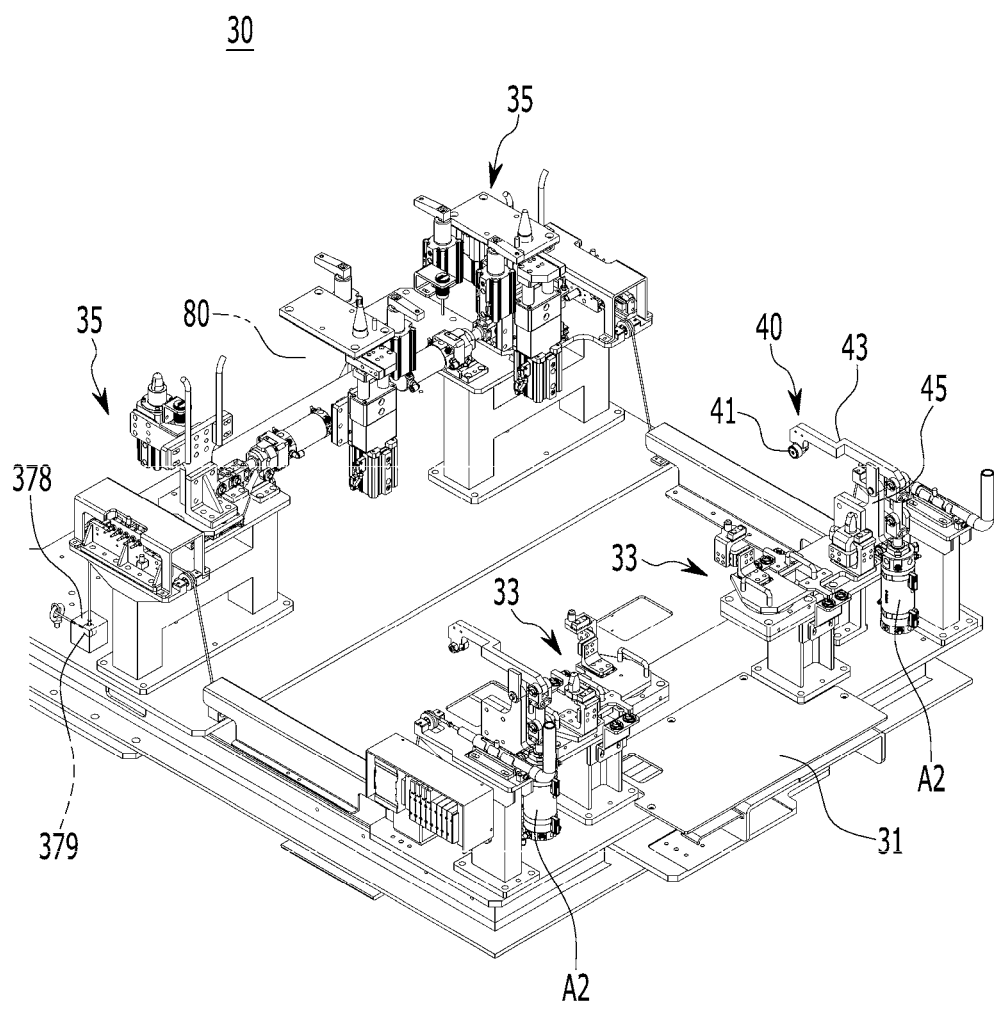
FIG. 3 is a configuration view of an assembly unit applied to the system for assembling vehicle body components according to the embodiment of the present disclosure.

FIG. 3 is a configuration view of the assembly unit 30 applied to the system 10 for assembling vehicle body components according to the embodiment of the present disclosure.

Referring to FIG. 3, four sets of assembly units 30 having the same configuration may be provided on the upper surface of the rotary plate 23.

Since the four assembly units 30 have the same configuration, only one of the example assembly units 30 will be described.

The plurality of assembly units 30 are provided by means of fixing plates 31 disposed at predetermined intervals on the upper surface of the rotary plate 23.

The assembly units 30 are configured such that the rotation of the rotary plate 23 is supported by a plurality of support rollers 310 provided on the upper portion of the mounting frame 21 and disposed around the rotary plate 23.

The assembly unit 30 is configured such that the first component 1 and the second component 3 are loaded onto a replacement jig 33 attachable to or detachable from the upper surface of the fixing plate 31 depending on the types of vehicles, and the first component 1 and the second component 3 are loaded onto a fixing jig 35 fixed and spaced apart from the replacement jig 33.

The assembly unit 30 may be rotated at a predetermined angle by the index table 20 and continuously assemble the first component 1 and the second component 3.

Figure 4:
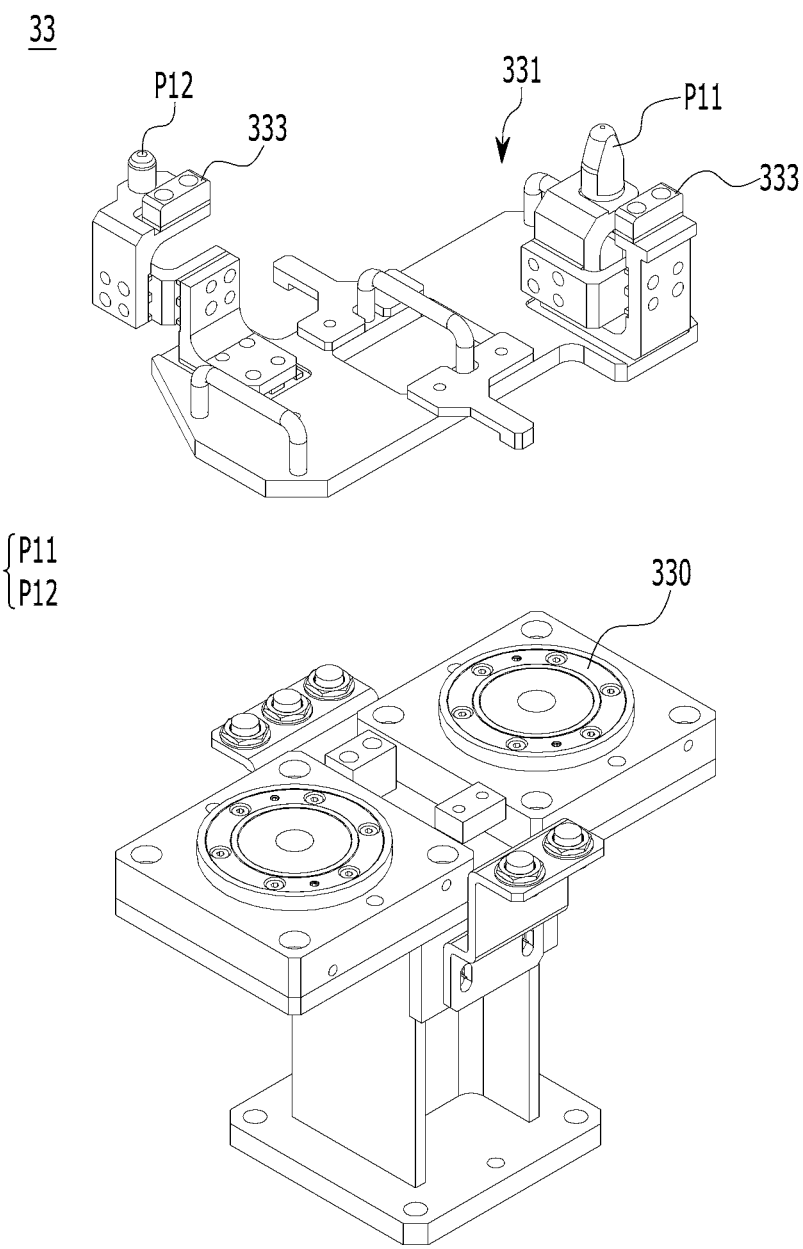
FIG. 4 is a view for explaining a replacement jig applied to the system for assembling vehicle body components according to the embodiment of the present disclosure.

FIG. 4 is a view for explaining the replacement jig applied to the system for assembling vehicle body components according to the embodiment of the present disclosure.

Referring to FIG. 4, the replacement jigs 33 are disposed outside the center of the index table 20. The pair of replacement jigs 33 may be symmetrically disposed at two opposite sides facing each other and replaced depending on the types of vehicles. The replacement jig 33 includes air chucks 330 fixed to the fixing plate 31. A replacement jig module 331 is detachably mounted on the air chucks 330.

The replacement jig module 331 includes first tooling pins P1, the positions of which are set for the respective types of vehicles so that the first tooling pins P1 are fitted into corresponding tooling holes of the first and second components 1 and 3.

For example, the first tooling pins P1 include a first front tooling pin P11 and a first rear tooling pin P12. The first front tooling pin P11 is inserted into the corresponding tooling hole of the first component 1, and the first rear tooling pin P12 is inserted into the corresponding tooling hole of the second component 3.

Seating blocks 333 may be respectively provided at one side of the first front tooling pin P11 and one side of the first rear tooling pin P12.

Because the first and second components 1 and 3 have different tooling holes for the respective types of vehicles, the replacement jig module 331 may be replaced by the air chucks 330 depending on the types of vehicles.

That is, the positions of the first tooling pins P1 of the replacement jig module 331 vary depending on the types of vehicles.

The replacement jig module 331 may be replaced manually by the user or automatically by the robot.

In this case, the replacement jig module 331 may have a handle to allow the user to manually replace the replacement jig module 331.

Figure 5:
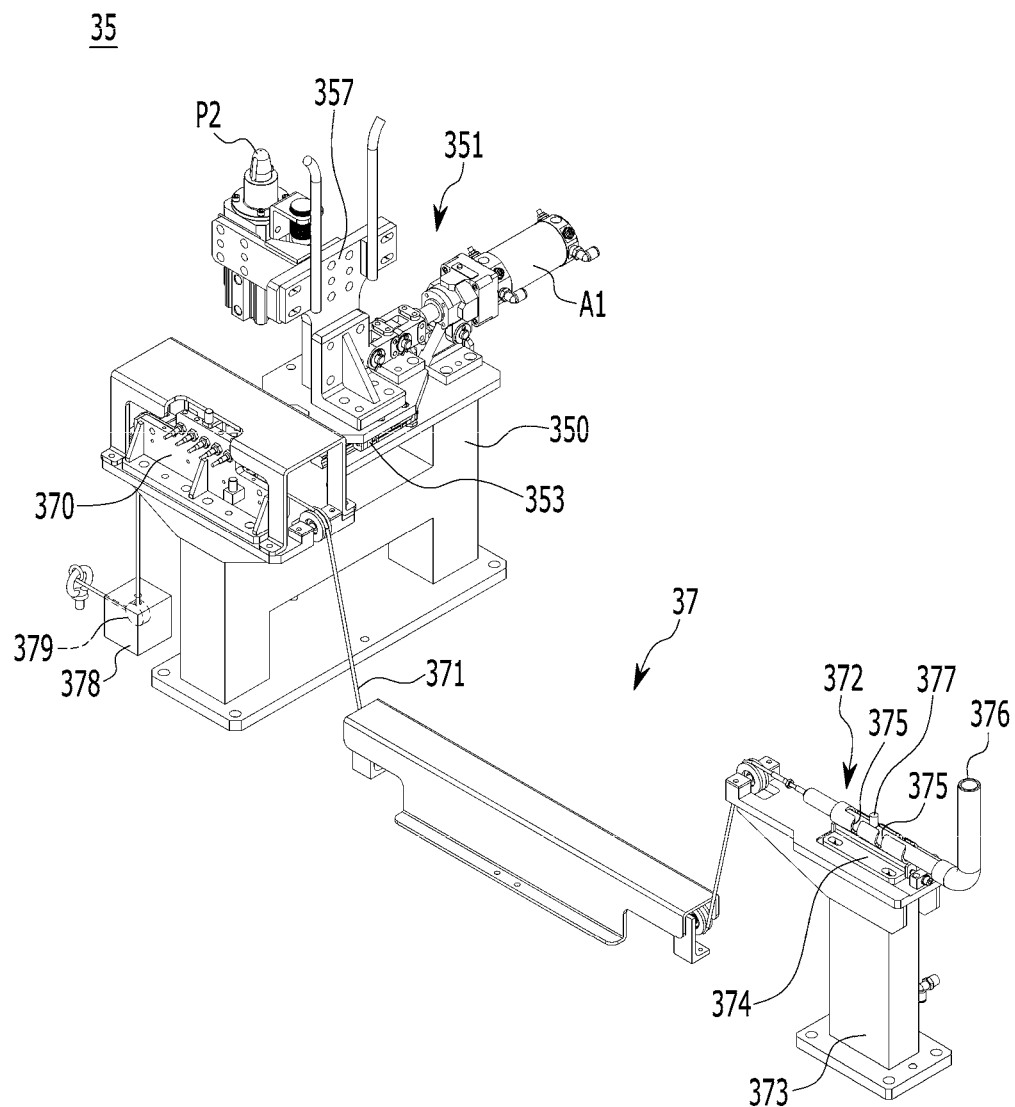
FIGS. 5 and 6 are views for explaining a fixing jig applied to the system for assembling vehicle body components according to the embodiment of the present disclosure.
Figure 6:
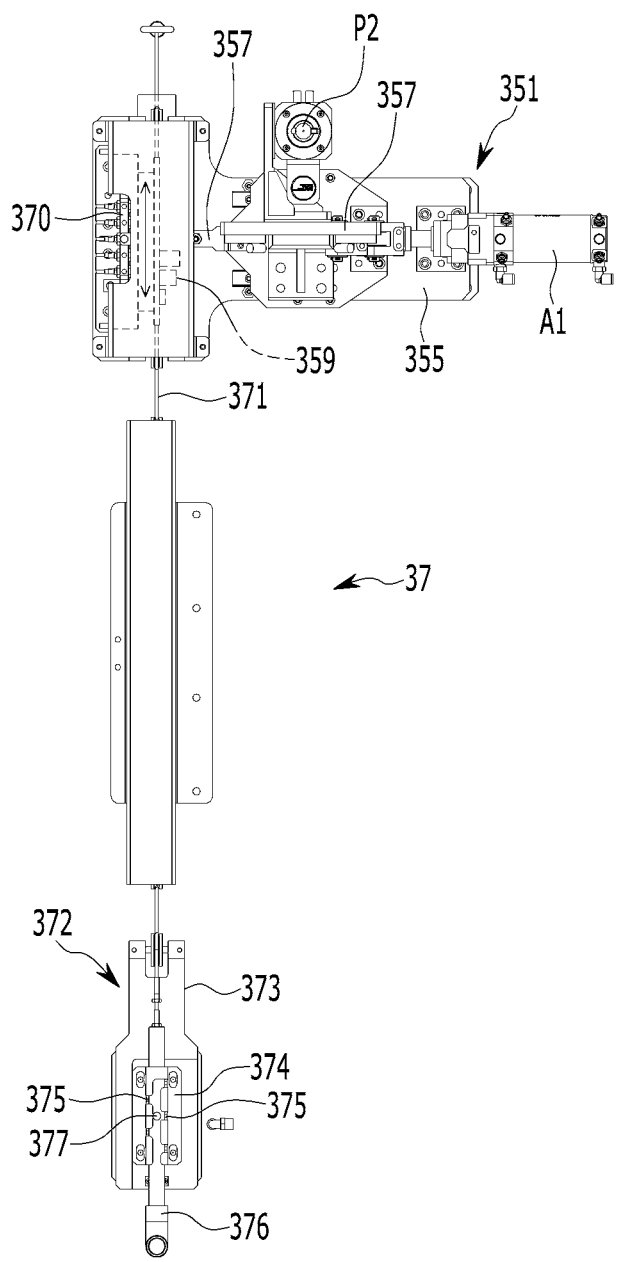

FIGS. 5 and 6 are views for explaining the fixing jig applied to the system for assembling vehicle body components according to the embodiment of the present disclosure.

Referring to FIGS. 5 and 6, the fixing jigs 35 are provided on the fixing plate 31 and disposed inside the center of the index table 20. The pair of fixing jigs 35 is symmetrically disposed at two opposite sides facing each other. The positions of the pair of fixing jigs 35 may be changed by an adjustment device 37 in a direction in which the pair of fixing jigs 35 moves toward or away from each other. The fixing jig 35 is fixed to the fixing plate 31 by means of a fixing table 350. In addition, the fixing jig 35 includes a fixing jig module 351 mounted on the fixing table 350 so as to be slidable by a first drive unit A1. The fixing jig module 351 includes a second tooling pin P2 fitted into a corresponding tooling hole of the first component 1.

Further, the fixing jig module 351 includes a movable plate 355 mounted on the fixing table 350 to be slidable along a rail 353.

The second tooling pin P2 is mounted on the movable plate 355 by means of a connection block 326. The first drive unit A1 is connected to the connection block 326.

In addition, a contact block 357, which comes into contact with a stopper 359, is mounted at one side of the movable plate 355 opposite to the first drive unit A1.

The contact block 357 is configured to come into contact with the stopper 359.

The fixing jig module 351 may be configured to handle the respective types of vehicles by means of the adjustment device 37.

The adjustment device 37 may be disposed on the fixing table 350 and provided at one side adjacent to the fixing jig module 351. The adjustment device 37 includes a plurality of stoppers 359 protruding toward the fixing jig module 351. The plurality of stoppers 359 are provided to change the position of the second tooling pin P2. In this case, the stoppers 359 are mounted on a stopper mounting plate 370 mounted to be slidable along the fixing jig module 351.

A wire 371 is penetrativity connected to the stopper mounting plate 370.

A handle part 372 is connected to one end of the wire 371. The handle part 372 may be disposed at a tip of the wire. The handle part 372 includes a sub-table 373 fixed to the fixing plate 31, and a restriction bracket 374 installed on the sub-table 373.

The restriction bracket 374 has a plurality of restriction grooves 375 that sets the positions of the stoppers 359 that come into contact with the fixing jig module 351 for the respective types of vehicles.

Further, the handle part 372 includes a rod 376 connected to one end of the wire 371 and fitted into the restriction bracket 374.

The rod 376 operates so that a restriction pin 377 mounted on an outer surface thereof is fitted into the restriction groove 375 corresponding to the type of vehicle.

In addition, a balance part 378 is disposed at the other end of the wire 371.

The balance part 378 serves to provide a restoring force to the wire 371. To this end, the balance part 378 includes a restoring spring 379.

The adjustment device 37 adjusts the rod 376 to fit the restriction pin 377 into the restriction groove 375 corresponding to the type of vehicle, thereby disposing the corresponding stopper 359 at an exact position at which the stopper 359 comes into contact with the contact block 357.

As the contact block 357 comes into contact with the stopper 359, the position of the second tooling pin P2 is set depending on the type of vehicle. The rod 376 of the adjustment device 37 may be adjusted by the user or the robot.

Meanwhile, the assembly unit 30 further includes a pressing unit 40 disposed at one side adjacent to the replacement jig 33 (see FIG. 3). The pressing unit 40 fixes the first component 1 by pressing the first component 1 in the vertical direction. The pressing unit 40 includes a link arm 43 having a roller 41 mounted at one side tip thereof and configured to be in slipping contact with the first component 1.

A second drive unit A2 is hingedly connected to the other side tip of the link arm 43. The second drive unit A2 is mounted on the fixing plate 31 and pushes the other side tip of the link arm 43 upward.

In addition, a link bracket 45 is hingedly connected to one lower side of the link arm 43. The link bracket 45 is hingedly connected to one side of the second drive unit A2 and may support the operation of the link arm 43.

Figure 7:
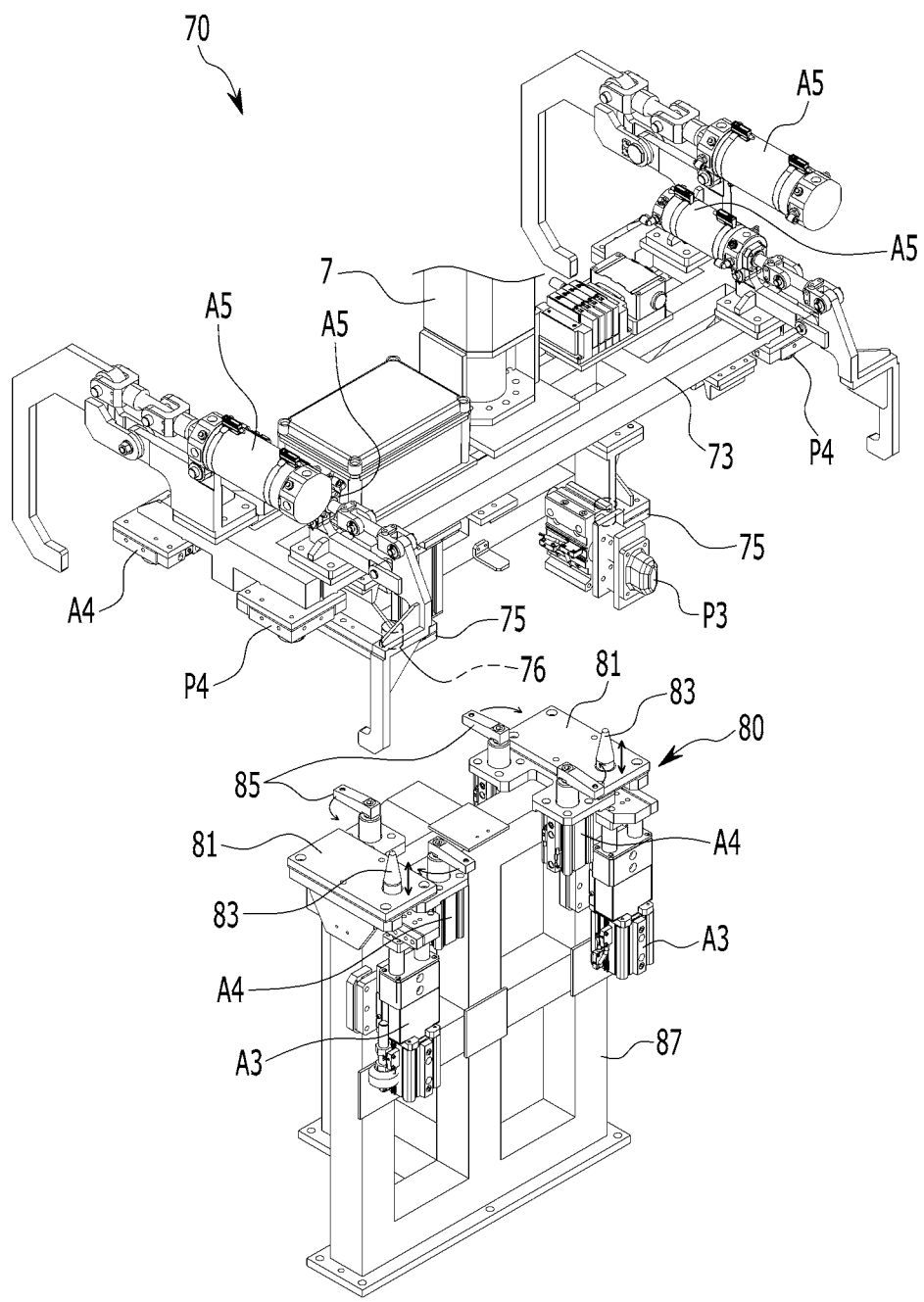
FIG. 7 is a view for explaining a clamping unit applied to the system for assembling vehicle body components according to the embodiment of the present disclosure.

FIG. 7 is a view for explaining the clamping unit applied to the system for assembling vehicle body components according to the embodiment of the present disclosure.

Referring to FIG. 7, the clamping units 70 are disposed to correspond to the third assembly section S3. The plurality of clamping units 70 are provided to correspond to the types of vehicles and clamps the first and second components 1 and 3 seated on the replacement jig 33 and the fixing jig 35. Each clamping unit 70 is mounted at a tip of the robot arm 71 and operates. The clamping unit 70 is connected to a docking unit 80 disposed between the fixing jigs 35 and clamps the first and second components 1 and 3.

In this case, the docking unit 80 includes a docking table 87 disposed between the pair of fixing jigs 35. The docking table 87 is fixed to the fixing plate 31. Docking plates 81 are disposed at two opposite sides of an upper surface of the docking table 87.

A docking pin 83 is penetrativity installed in the docking plate 81 and operated upward or downward by a third drive unit A3.

When the clamping unit 70 is seated on the docking plates 81, the docking pins 83 are raised or lowered by the third drive units A3 to dispose the clamping unit 70 at the exact position.

Rotary clampers 85 are mounted on the docking table 87 and each disposed at one side adjacent to the docking plate 81.

When the clamping unit 70 is seated on the docking plates 81, the rotary clampers 85 are rotated by fourth drive units A4 to fix the clamping unit 70. A body 73 of the clamping unit 70 is seated on the docking table 87.

Connection plates 75 are disposed on a lower surface of the body 73 to correspond to the docking plate 81 and connected to the docking plates 81. Each connection plate 75 has a docking hole 76. The docking hole 76 is a hole into which the docking pin 83 is inserted.

A plurality of clamping arms 77 are symmetrically disposed at two opposite sides of the body 73 that face each other. The clamping arms 77 clamp the first and second components 1 and 3 by a fifth drive unit A5 when the first and second components 1 and 3 are seated on the replacement jig 33 and the fixing jig 35.

Third tooling pins P3 are disposed at two opposite ends of the lower surface of the body 73. The third tooling pins P3 are inserted into corresponding tooling holes of the first component 1.

Fourth tooling pins P4 are disposed at lateral sides of the central portion of the body 73. The fourth tooling pins P4 are inserted into corresponding tooling holes of the second component 3.

Finally, in the present embodiment, a first welder 90 is disposed in the third assembly section S3 (see FIG. 2).

The first welder 90 primarily welds the first component 1 and the second component 3 by using a robot. Further, a second welder 91 is disposed in the fourth assembly section S4. The second welder 91 secondarily welds the first and second components 1 and 3 by using a robot, thereby completing the process of assembling the first and second components 1 and 3.

FIGS. 8 to 11 are views for explaining an operation of the system 10 for assembling vehicle body components according to the embodiment of the present disclosure.

Figure 8:
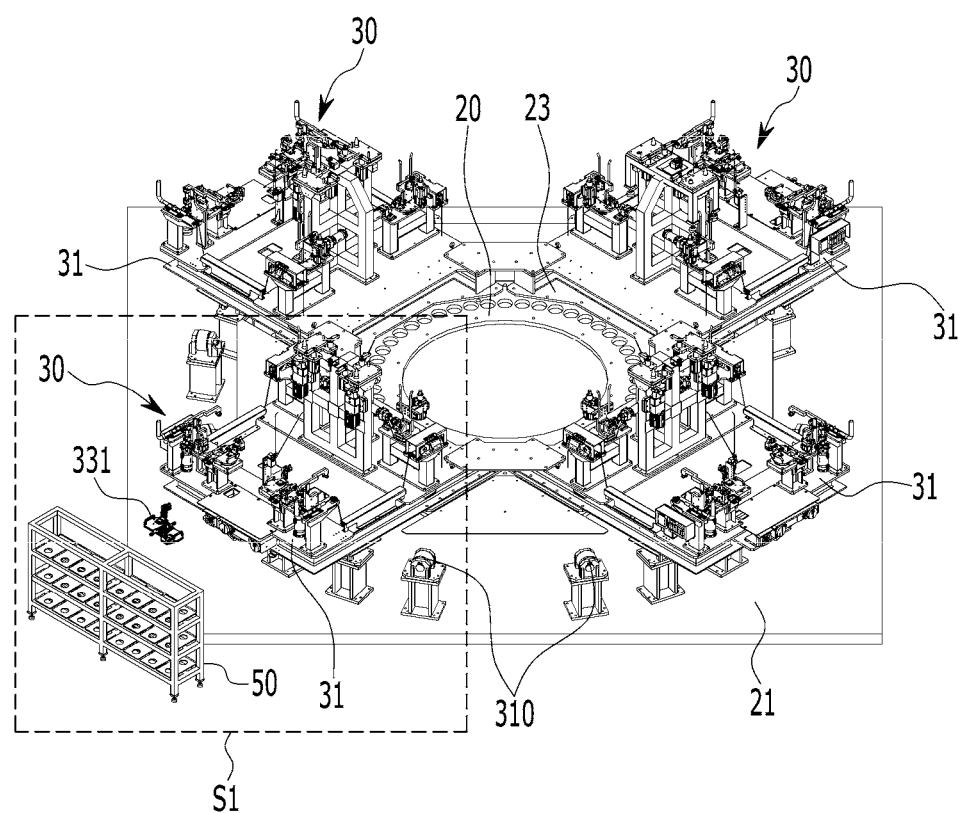
FIGS. 8, 9, 10, and 11 are views for explaining an operation of the system for assembling vehicle body components according to the embodiment of the present disclosure.

Referring to FIG. 8, the system 10 for assembling vehicle body components according to the embodiment of the present disclosure loads the replacement jig 33 in the first assembly section S1 in accordance with the type of vehicle.

The replacement jig 33 may be replaced manually or automatically.

Further, the adjustment device 37 sets the second tooling pin P2 of the fixing jig 35 in accordance with the type of vehicle. The index table 20 rotates by 90°.

Figure 9:
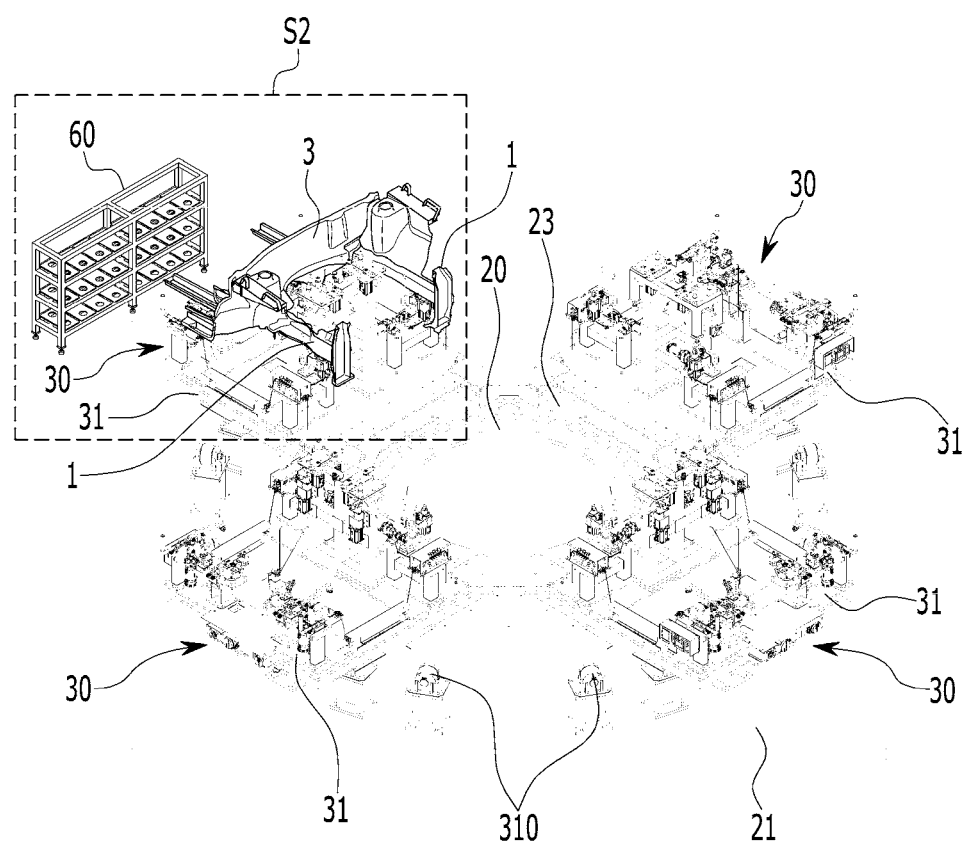

Referring to FIG. 9, in the second assembly section S2, the first and second components 1 and 3 are seated on the replacement jig 33 and the fixing jig 35.

In this case, the first component 1 is fixed by the first front tooling pin P11 of the replacement jig 33 and the second tooling pin P2 of the fixing jig 35, and the second component 3 is fixed by the first rear tooling pin P12 of the replacement jig 33.

In addition, the first and second components 1 and 3 are fixed by the pressing unit 40. The index table 20 rotates by 90°.

Figure 10:
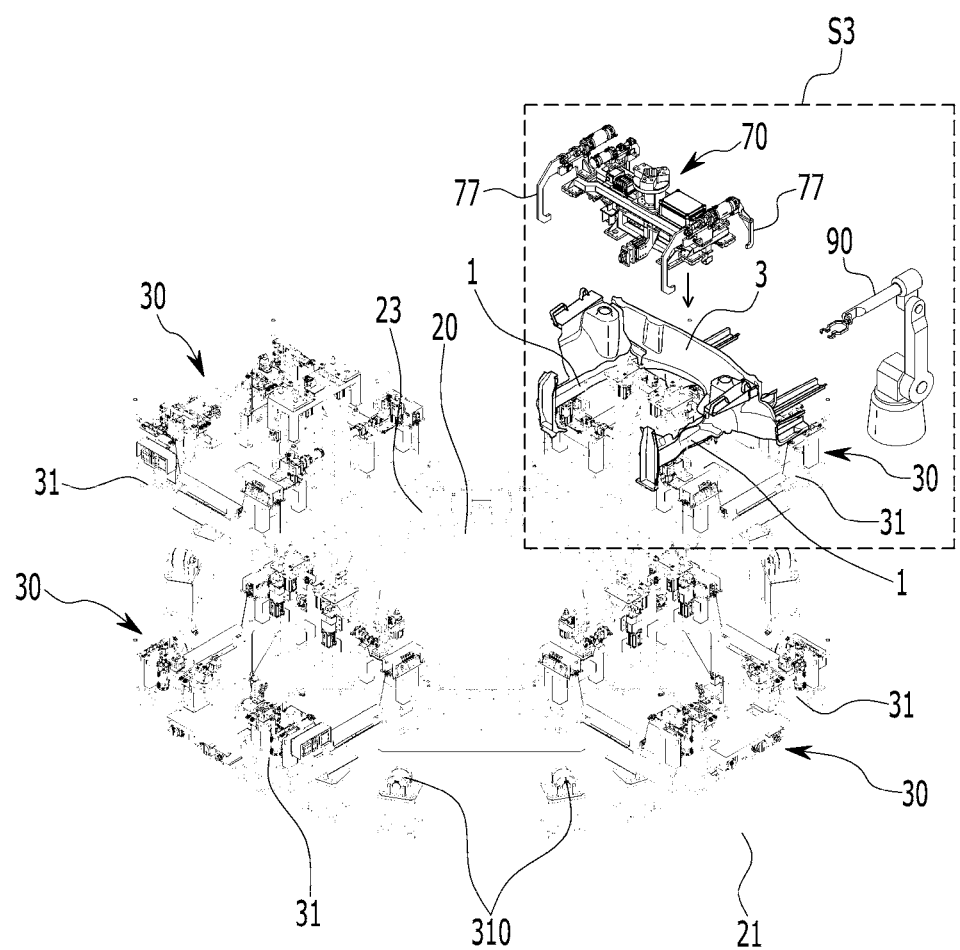

Referring to FIG. 10, the first and second components 1 and 3 fixed in the second assembly section S2 are loaded in the third assembly section S3.

In the third assembly section S3, the clamping unit 70 is connected by means of the docking unit 80. In this case, the third tooling pin P3 of the clamping unit 70 is inserted into the first component 1 to fix the first component 1.

Further, the fourth tooling pin P4 of the clamping unit 70 is inserted into the second component 3 to fix the second component 3.

Further, the first welder 90 moves toward the first and second components 1 and 3 and primarily welds the first and second components 1 and 3 in the state in which the first and second components 1 and 3 are completely fixed by the clamping arm 77 of the clamping unit 70.

When the primary welding is completed, the clamping unit 70 is detached from the docking unit 80 and restored to an initial position. The index table 20 rotates by 90°.

Figure 11:
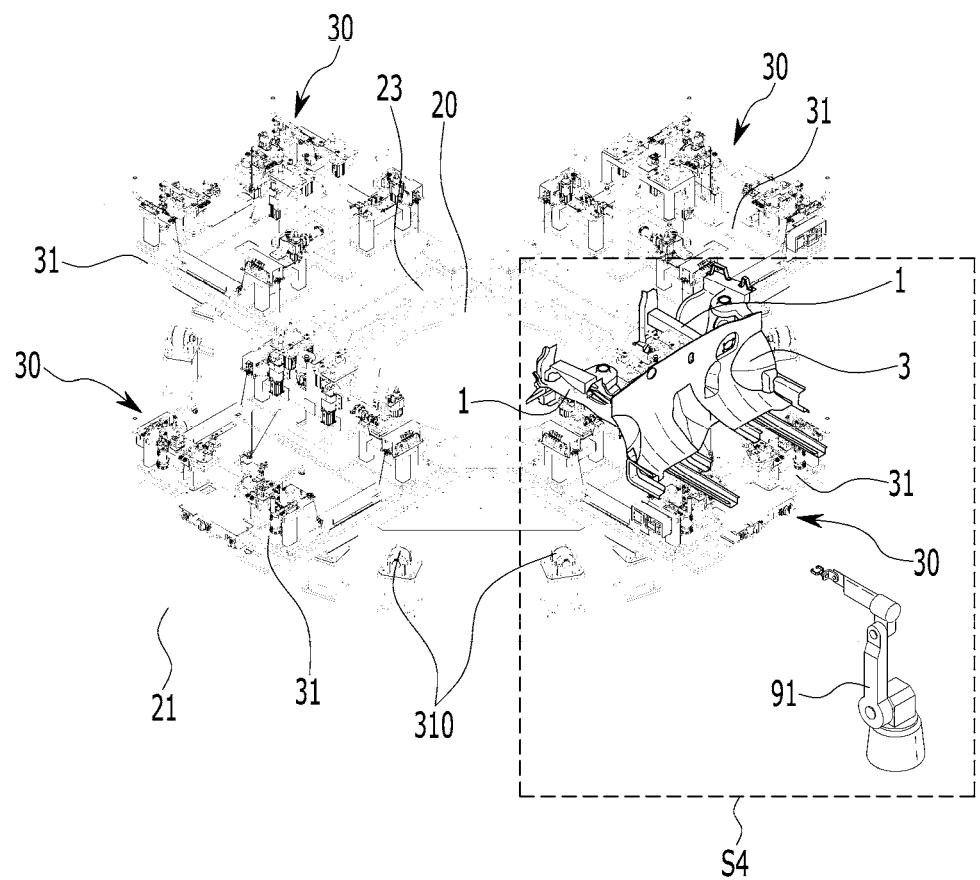

Referring to FIG. 11, the first and second components 1 and 3 primarily welded in the third assembly section S3 are loaded into the fourth assembly section S4.

In the fourth assembly section S4, the first and second components 1 and 3 are joined by being secondarily welded by the second welder 91, such that the assembly process is finished.

Since the rotatable index table 20 is applied to the system 10 for assembling vehicle body components according to the embodiment of the present disclosure, the space efficiency may be improved.

In addition, the system 10 for assembling vehicle body components according to the embodiment of the present disclosure may handle various types of vehicles, thereby reducing initial investment costs.

Further, according to the system 10 for assembling vehicle body components, the types of vehicles may be changed even manually, thereby simplifying the facility and reducing the facility weight and manufacturing costs.

While the present disclosure has been described above with reference to the exemplary embodiments, it may be understood by those skilled in the art that the present disclosure may be variously modified and changed without departing from the spirit and scope of the present disclosure disclosed in the claims.

The invention claimed is:

1. A system for assembling vehicle body components, which assembles first and second components to be applied to a vehicle, the system comprising:
   an index table rotatably positioned on a mounting frame;
   a plurality of assembly units positioned on an upper surface of the index table in four directions by a plurality of rotary plates, and each assembly unit including a replacement jig configured to be attachable or detachable depending on the types of vehicles, and each assembly unit further including a fixing jig fixed and spaced apart from the replacement jig, the replacement jig and the fixing jig being configured to allow the first and second components to be loaded thereon, and the plurality of assembly units being configured to be rotated by a predetermined angle by the index table so that a plurality of the first and a plurality of the second components are welded together while passing through a plurality of assembly sections;
   a replacement jig palette positioned in a first assembly section and configured to store a plurality of replacement jigs for the respective types of vehicles;
   a component palette positioned in a second assembly section and configured to store the plurality of first components and the plurality of second components;
   a plurality of clamping units positioned in a third assembly section, the plurality of clamping units provided depending on the types of vehicles, and the plurality of clamping units being configured to clamp the plurality of first and the plurality of second components seated on the replacement jig and the fixing jig; and
   welders positioned in the third assembly section and the fourth assembly section and configured to weld the plurality of first components and the plurality of second components.

2. The system of claim 1, wherein a rotation of each rotary plate of each assembly unit is supported by a plurality of support rollers provided on an upper portion of the mounting frame and positioned around the rotary plate.

3. The system of claim 1, wherein each assembly unit comprises:
   a plurality of fixing plates disposed on an upper surface of the rotary plate at predetermined intervals;
   the replacement jigs provided on an upper surface of each fixing plate, positioned outside of a center of the index table, symmetrically configured at two opposite sides facing each other, and configured to be replaced depending on the types of vehicles; and the fixing jigs provided on each fixing plate, positioned inside of the center of the index table, symmetrically configured at two opposite sides facing each other, and having positions that are changed by an adjustment device in a direction in which the fixing jigs move toward or away from each other.

4. The system of claim 3, wherein each replacement jig comprises:

an air chuck fixed to the fixing plate; and a replacement jig module detachably mounted to the air chuck and comprising a plurality of first tooling pins having positions set for the respective types of vehicles to be fitted into corresponding tooling holes of the first and second components.

5. The system of claim 3, wherein each fixing jig comprises:

a fixing table fixed to the fixing plate;

a fixing jig module positioned on the fixing table, mounted to be slidable by a first drive unit, and having a second tooling pin fitted into a corresponding tooling hole of the first component; and the adjustment device positioned on the fixing table at one side adjacent to the fixing jig module, and having a plurality of stoppers protruding toward the fixing jig module to change a position of the second tooling pin depending on the types of vehicles.

6. The system of claim 5, wherein each fixing jig module comprises a movable plate positioned on the fixing table and slidable along a rail, a second tooling pin is mounted on the movable plate by means of a connection block, the first drive unit is connected to the connection block, and a contact block, which comes into contact with the stopper, is mounted at one side of the movable plate opposite to the first drive unit and configured to come into contact with the stopper via the contact block.

7. The system of claim 5, wherein each adjustment device comprises:

a stopper mounting plate slidable along the fixing jig module and configured to allow the stoppers to be mounted thereon;

a wire connected to and penetrating the stopper mounting plate;

a handle part connected to one end of the wire and positioned at a tip of the wire; and a balance part positioned at the other end of the wire and configured to provide a restoring force to the wire.

8. The system of claim 7, wherein each handle part comprises:

a sub-table fixed to the fixing plate;

a restriction bracket on the sub-table and having a plurality of restriction grooves for setting positions of the stoppers that come into contact with the fixing jig module for the respective types of vehicles; and a rod connected to one end of the wire, fitted into the restriction bracket, and configured to allow a restriction pin mounted on an outer surface thereof to be fitted into the restriction groove depending on the types of vehicles.

9. The system of claim 7, wherein each balance part comprises a restoring spring configured to provide a restoring force to the wire.

10. The system of claim 3, wherein each assembly unit further comprises a pressing unit positioned at one side adjacent to the replacement jig, and configured to press and fix the first component seated on the replacement jig in a vertical direction.

11. The system of claim 10, wherein each pressing unit comprises:

a link arm having a roller mounted at one side tip thereof and configured to be in slipping contact with the first component;

a second drive unit hingedly connected to the other side tip of the link arm, mounted on the fixing plate, and configured to push the other side tip of the link arm upward; and a link bracket hingedly connected to one lower side of the link arm, hingedly connected to one side of the second drive unit, and configured to support an operation of the link arm.

12. The system of claim 3, wherein each clamping unit is mounted at a tip of a robot arm and configured to clamp the first and second components in a state in which the clamping unit is connected to a docking unit positioned between the fixing jigs.

13. The system of claim 12, wherein each docking unit comprises:

a docking table positioned between the fixing jigs and fixed to the fixing plate;

docking plates positioned at two opposite sides of an upper surface of the docking table;

docking pins positioned in and penetrating the docking plates and configured to be raised or lowered by a third drive unit to dispose the clamping unit at an exact position when the clamping unit is seated on the docking plates; and a plurality of rotary clampers provided on the docking table, mounted at one side adjacent to the docking plate, and configured to fix the clamping unit by being rotated by a fourth drive unit when the clamping unit is seated on the docking plates.

14. The system of claim 13, wherein each clamping unit comprises:

a body seated on the docking table;

a connection plate disposed on a lower surface of the body, configured to correspond to the docking plate, and connected to the docking plate;

a docking hole disposed on the connection plate and configured to allow the docking pin to be inserted thereinto;

a plurality of clamping arms symmetrically disposed at two opposite sides of the body facing each other and configured to clamp the first and second components by a fifth drive unit when the first and second components are seated on the replacement jig and the fixing jig;

third tooling pins disposed at two opposite ends of a lower surface of the body and inserted into corresponding tooling holes of the first component; and fourth tooling pins disposed at lateral sides of a central portion of the body and inserted into corresponding tooling holes of the second component.

15. The system of claim 1, wherein the welders comprise a first welder positioned in the third assembly section and configured to weld the first and second components using a robot.

16. The system of claim 1, wherein the welders comprise a second welder positioned in the fourth assembly section and configured to weld the first and second components using a robot.

* * * * *